United States Patent [19]

Cole, Jr.

[11] 4,000,992
[45] * Jan. 4, 1977

[54] DUST SUPPRESSION WITH SMALL BUBBLE FOAM IN CYCLONE

[76] Inventor: Howard W. Cole, Jr., 12 Vale Drive, Mountain Lakes, N.J. 07046

[ * ] Notice: The portion of the term of this patent subsequent to Nov. 12, 1991, has been disclaimed.

[22] Filed: Nov. 27, 1974

[21] Appl. No.: 527,812

[52] U.S. Cl. .................. 55/87; 55/92; 55/238; 55/261; 261/DIG. 26
[51] Int. Cl.² .......................... B01D 47/00
[58] Field of Search .............. 55/235–238, 55/233, 261, 87, 92; 261/DIG. 26

[56] References Cited

UNITED STATES PATENTS

| 3,186,943 | 6/1965 | Barthauer | 55/87 |
| 3,710,554 | 1/1973 | Brookman | 261/79 A |
| 3,811,247 | 5/1974 | Hupke | 55/233 |
| 3,847,571 | 11/1974 | Cole | 55/87 |
| 3,880,624 | 4/1975 | Arnold et al. | 55/440 |

FOREIGN PATENTS OR APPLICATIONS

| 405,389 | 2/1934 | United Kingdom | 55/87 |
| 466,574 | 5/1937 | United Kingdom | 261/DIG. 26 |

Primary Examiner—Bernard Nozick
Attorney, Agent, or Firm—Roy C. Hopgood; John M. Calimafde; Eugene J. Kalil

[57] ABSTRACT

Water sprays and foam, of the type used for fire fighting, have been used for dust suppression; but were not effective in removing the smaller particles from dust laden air. This invention uses a foam of high film strength that makes possible the bending of the foamed film to shorter radiuses of curvature and resultng smaller bubbles. Such a foam can be used to remove all of the detectable particulate matter from dust laden air or other gases.

9 Claims, 4 Drawing Figures

4,000,992

DUST SUPPRESSION WITH SMALL BUBBLE FOAM IN CYCLONE

RELATED PATENT APPLICATION

Apparatus and methods of using small bubble foam of this invention is disclosed in my patent application Ser. No. 396,246, filed Sept. 11, 1973, now U.S. Pat. No. 3,847,571 issued Nov. 12, 1974.

BACKGROUND AND SUMMARY OF THE INVENTION

The use of foam for dust suppression, and for removing particulate matter from a gas stream, is disclosed in my patent application referred to above. The term "foam", as used herein, designates a mixture of liquid, gas, and a surfactant that gives the liquid a film strength which permits the formation of long lasting bubbles when the mixture is agitated to convert it into a mass of bubbles. The liquid used is normally water, and the gas is usually air, because these ingredients are of low cost; but other gas and/or liquid can be used when compatible with the surfactant.

Various compounds are used as surfactants and these can be purchased on the open market. Some of these compounds are proprietary. The strength of the film depends upon the characteristics of the surfactant, and the amount of the surfactant in the liquid-gas mixture as will be more fully explained.

I have discovered that the reason that ordinary firefighting foam does not effectively remove all particulate matter from air, stack gases or other dust-laden gases is because the bubbles of the foam are too large. In this specification, reference to removing particulate matter from gas is to be understood as including the removal of substantially all, and especially small particles, such as dust, from an air stream; all detectable particulate matter carried by stack gases from a furnace; and substantially all small particles of solid matter carried by any stream of gas. Reference to bubbles is to be understood as bubbles of a stable foam, that is, a foam that will last for periods of time, if left standing, such as some fire-fighting foams which last for periods of one-half to three hours.

In order to have small particulate matter efficiently trapped, it is necessary for the particle to contact with a bubble of the foam and burst the bubble. As the bubble bursts, the gas in the bubble escapes; the bubble implodes; and the liquid film of which the bubble was made coats the particle. Small particles do not burst large bubbles and are not wetted or trapped by the foam. The smaller the bubble, the smaller the particles that can be trapped. This invention traps all detectable particles as a result of smaller bubbles made with higher strength foam.

It may seem paradoxical that small bubbles are necessary in order to trap small particles by having the particles burst and implode the bubble, and yet require that the material for making the small bubble foam must have higher tensile strength than the larger bubble foam. My theory on this is that because small bubbles have smaller radii of curvature than larger bubbles, higher film strength is necessary in order to be able to hold the film bent to the extremely short radius of a small bubble.

Without high film strength, the small bubbles burst into one another and form larger bubbles where the radius of curvature is larger and the film is under less tension.

As for the small particles being able to burst small bubbles but not large ones, it may be that the film forming the small bubble is already under sufficient tensile stress so that particles of small size and mass will burst the bubble. It may also be that smaller bubbles have thinner films.

Whatever the explanation, I have discovered that the small bubble foam produces unexpected results. For example, this invention was applied to a stack where State Inspectors required that the owner of the plant reduce the particulate matter from his stack gases or close the plant. This invention, with the small bubble foam, removed substantially all detectable particulate matter from the stack gases and brought the particulate matter lower than requirements of the State Inspector. The difference was so remarkable that the State Inspectors required a second test after checking the accuracy of their detection equipment; and the second test showed the same results.

The foam described in this specification has the bubbles burst by contact with small particles of material (dust) and the bursting bubble wets the particle. Particles as small as one micron are readily wetted. As this effect proceeds, the foam is destroyed by contact with the particles. The wetted particles must then be either
 1. brought together,
 2. made to contact larger particles, or
 3. brought into contact with a surface, which may be additional foam.

If the foam is injected into a free-falling aggregate (at a transfer point between belts, for example, or injected into a crusher along with the aggregate), the mechanical motion of the aggregate will provide the required particle to particle contact. When the foam is injected into an aggregate which is all fines (1 to 200 micron) some means must be provided to cause the wetted particles to coalesce. This is readily accomplished by use of a cyclone, as disclosed in my patent application referred to above, or other centrifugal device. A simple cyclone can be made 99.99% efficient by the injection of the small bubble foam of this invention along with the particle laden input to the cyclone.

I have also discovered that as particles burst the bubbles and destroy progressively more of the foam, it is advantageous to keep the supply of foam sufficient so that there is an excess of foam to form a slurry that will drain from the space where the removal of the particles takes place. A slurry consisting of foam will carry more solid material than an ordinary slurry of water and particulate matter.

Another advantage of small bubble foam is that it can be ejected from nozzles at considerable pressure and resulting high velocity. This will be explained more fully in the description of the preferred embodiment.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

The mixture used for this invention is preferably a mixture of air, water and a surfactant that is made for "high expansion foam". Such a foam has a high expansion ratio when the foam is developed by conventional fire equipment; that is, an ultimate volume of foam which is from 100 to 1000 times, or more, of the volume of the water and surfactant from the foam is formed.

While the present invention uses a surfactant of this type in order to obtain great film strength, the expansion ratio is reduced by the fact that the foam is made with small bubbles. Bubble formation in making foam with my equipment is the result of vortex effect in a passage. The boundary layer of the unfoamed mixture drags on the sides of the passage, and the smaller the passage, the more the turbulence and vortex action.

Figure 1:
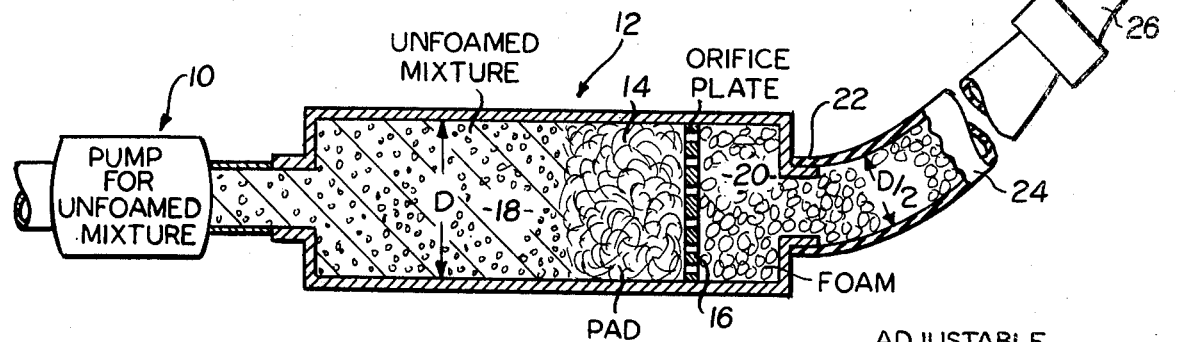
FIG. 1 is a diagrammatic sectional view showing a foam generator for making small bubble foam which is used with this invention.

FIG. 1 is a diagrammatic sectional view of apparatus for making the small bubble foam of this invention. The mixture of water, air and surfactant ("foaming agent") is forced by the pump 10 into a foamer 12 which contains a cartridge pad 14.

This pad 14 has a myriad of small interconnecting interstices. It may be a sponge made of polyurethane or other plastic; but the preferred structure is a stainless steel scouring pad sold under the trademark "CHORE BOY" and manufactured by Metal Textile Co., P.O. Box 315, South Bound Brook, New Jersey 08880.

One or more of these pads 14 are stuffed into the hollow interior of the container 12 until the full cross section of the container is evenly filled across one end of the interior of the container as shown in FIG. 1. A perforated partition 16 in the container is positioned to divide the container into a pad chamber 18 and a foam chamber 20. The small bubble size is obtained by pushing the unfoamed mixture through a myriad of tortuous passages under sufficient pressure to obtain a high velocity that will result in the small foam bubbles.

With a CHORE BOY scouring pad 14 stuffed into the chamber 18 of the container 12, with a diameter "D" of 3 inches, and with the scouring pad of an axial length of approximately 3 inches, the foam should be discharged from an outlet 22 at the rate of from 5 to 10 cubic feet per minute in order to have the necessary velocity through the foaming pad 14 to produce the small bubbles required by this invention. This example is given merely by way of illustration. The mixture supplied to the foamer 12 has water equal to from 1 to 4% of the volume of the air and the surfactant is from 1 to 6% of the volume of the water and preferably 2%. The expansion ratio of the foam may be from 25 to 100. Expansion Ratio = Vol. gas/Vol. liquid.

Suitable surfactants can be purchased from suppliers of fire-fighting foam, and from other sources. A preferred surfactant for this invention is DeTer 1009 Foam Agent sold by the DeTer Company, Inc., of Mountain Lakes, New Jersey.

Conventional foams can flow by gravity and can be pushed through passages if the pressure is low. High velocity foam has to have considerable pressure behind it, and this is possible with foam having very small bubbles but cannot be used for large bubble foam because the bubbles collapse. Thus small bubble foam can be penetrated into a dusty mass of material such as at material transfer points already described. The equipment shown in FIG. 1 will produce foam having bubbles between 0.0005 and 0.015 inch. This will trap particulate matter as small as 1 micron in diameter and carry large pieces up to 1 inch in size. The foam can effectively trap such small particles if the average size of the foam bubbles is less than 0.015 inch; but the same amount of foam will trap more particles if all of the bubbles are smaller than 0.015 inch and preferably between 0.0005 and 0.015 inch as already described.

The outlet 22 of the foamer 12 has a flexible pipe or hose 24 leading to a nozzle 26 from which foam 27 is discharged under substantial velocity for permeation through a mass of dusty material at a transfer point or other location where the material is in motion and dust would be discharged into the ambient atmosphere if the foam 27 were not used to suppress the dust.

Figure 2:
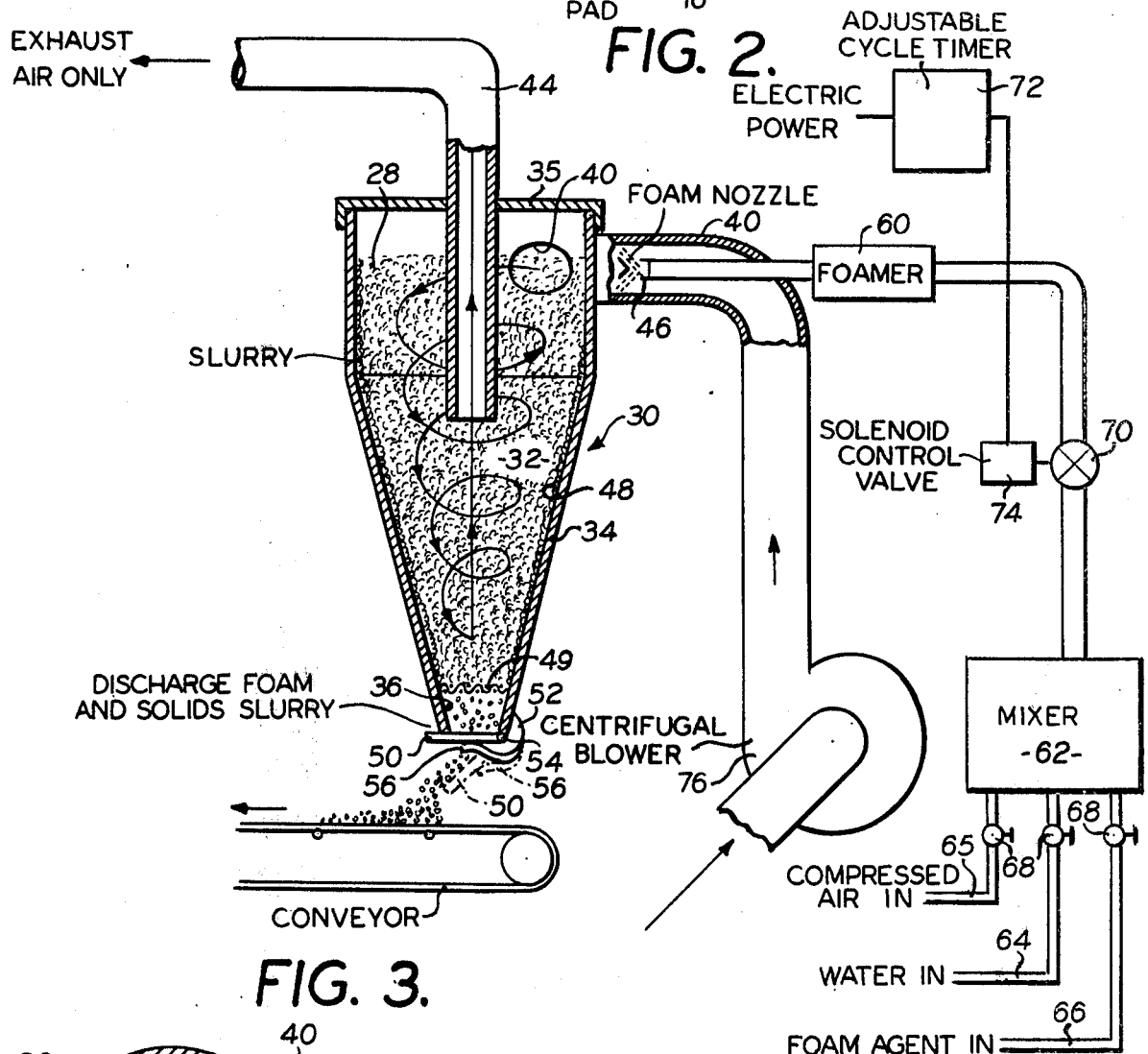
FIG. 2 is a diagrammatic view showing a cyclone separator equipped with a foam supply and with means for withdrawing particulate matter from the cyclone chamber in a foam slurry.
Figure 3:
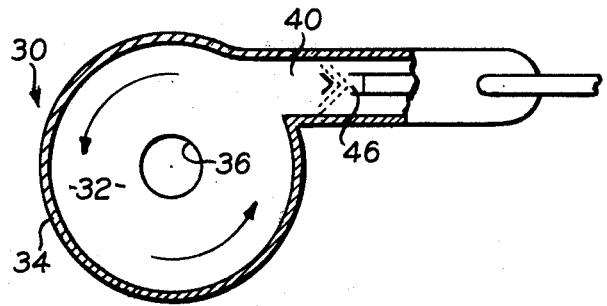
FIG. 3 is a sectional view taken on the line 3—3 of FIG. 2.

FIG. 2 of the drawing shows a cyclone separator 30 which has a frusto-conical separation chamber 32 with a wall 34 that extends downward to an opening 36.

Gas, laden with particulate matter, flows into the chamber 32 from a passage 40 at the upper end of the chamber 32. This passage 40 is positioned to discharge its gas stream tangentially around the circumference of the upper part of the chamber 32 and in contact with the wall 34.

The passage 40 discharges gas into the separation chamber, which has a cover 15, and the gas flows downwardly with a swirling movement and increasing velocity as the cross section of the separation chamber decreases. Particulate matter in the gas is thrown outward by centrifugal force and the gas, separated from its particulate matter, reverses its flow at the center region of the separation chamber and flows upward to an outlet discharge 44 which extends upward through the top of the chamber and in substantial alignment with the axis of the chamber 32. The construction and operation of the cyclone separator, thus far described, is in accordance with conventional practice.

This invention introduces foam into the particulate laden gas stream. In the illustrated embodiment, the foam is injected into the gas stream by a nozzle 46 which extends into the gas inlet passage 40 upstream from the outlet of this passage 40 where the gas flows into the separation chamber 32. The foam traps the particulate matter and forms, with the particulate matter, a slurry.

The coating of slurry, indicated by the reference character 48, on the wall of the separation chamber is indicated in elevation by stippling in the drawing and is shown in section where the wall 34 is shown in section. The slurry 48 runs down the wall and accumulates in the lower part of the separation chamber 32 at the opening 16 which is normally closed by a bottom 50.

In the construction illustrated, the bottom 50 is supported from the wall 34 by a bracket 52 to which the bottom is connected by a hinge comprising a pin 54 which extends through one side of the bottom 50 and through aligned openings in the bracket 52. A spring 56 is connected at one end to the bracket 52, and the other end of the spring 56 contacts with the bottom 50 to hold the bottom in a position to close the opening 36, as indicated in full lines in FIG. 1. When sufficient weight of slurry accumulates in the lower end of the separation chamber 12, the weight of the slurry overcomes the force of the spring 56 and causes the bottom 50 to swing into an open position as indicated in dotted lines in FIG. 2. The accumulated slurry drops out of the chamber, and the spring 56 pushes the bottom 50 back into closed position.

A foam generator 60 supplies the nozzle 46. Foam generators are well-known and the block diagram of FIG. 2 is sufficient for a complete understanding of this invention. Water, air and foaming agent are supplied to the foamer 60 from a mixer 62; and the water, air and foaming agent are supplied to the mixer 62 through pipes 64, 65 and 66, respectively.

Each of the pipes 64, 65 and 66 is shown with a valve 68 for regulating the supply of water, air or foaming agent, and the proportions in which these ingredients are supplied to the mixer 62. These valves 68 are merely representative of means for controlling the supply of the ingredients to the mixer 62 and for proportioning the ingredients.

More elaborate controls for the ingredients supplied to the mixers 62 can be used, such as fluid flow regulators that receive fluid at variable pressure and deliver it at a uniform pressure and/or flow. These controls are adjustable to regulate the proportions supplied to a mixer. Such controls are also well-known and the particular apparatus used for controlling the flow and proportions of the ingredients is a matter of choice.

Experience has shown that it is not essential to supply foam continuously to the separator. It is sufficient that the wall of the separation chamber be at least partially coated with foam at all times. In order to conserve foam, a control valve 70 is located between the mixer and the foamer for shutting off the mixture at times when no foam is required.

In order to program the supply of foam with the operation of the cyclone separator a cycle timer 72 controls a power supply to a solenoid or other actuator 74 for the valve 70. The cycle timer 72 opens and closes the valve 70 periodically and for such length of time as necessary to maintain the required amount of foam in the separation chamber.

In accordance with conventional practice, the gas and particulate matter is supplied to the separator by a centrifugal blower 76 or other apparatus for moving the air and solids.

This invention is applicable to other types of separators where particulate matter is separated from a gas by centrifugal force derived by a change of direction of the air stream. The term "cyclone separator" is used herein to designate any such type of centrifugal separator.

Figure 4:
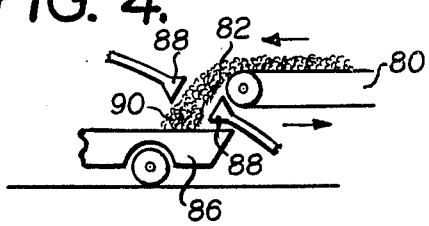
FIG. 4 is a diagrammatic view of a transfer point for dust laden material with foam projected into the transferring material.

FIG. 4 shows a belt conveyor 80 which transfers coal 82, or other dusty material, to truck 86. As the coal falls into the truck 86, dust would float off into the ambient atmosphere; and the smaller particles are the most objectionable because they are lighter and remain airborne for larger periods of time.

Foam nozzles discharge small bubble foam 90 into the moving mass of coal and the foam contacts with the dust present in the falling coal. The dust particles burst the bubbles with which they contact and the implosion of the bursting bubble traps and coats the dust particles with the liquid of which the bubble was formed.

The preferred embodiment of this invention has been illustrated and described, but changes and modifications can be made, and some features can be used in different combinations without departing from the invention as defined in the claims.

What is claimed is:

1. The method of separating very small particulate matter from a gas stream which comprises directing a stream of gas that contains the particulate matter, into a separation chamber of a cyclone separator, discharging into the chamber a small bubble foam, with bubbles of an average size less than 0.015 inch in diameter, to mix with the gas stream and move along the sides of the chamber, trapping the particulate matter from the gas stream in the foam to form a slurry, draining the slurry down the side wall of the separation chamber, and discharging the slurry from the lower part of the chamber.

2. The method described in claim 1 characterized by accumulating the slurry across a bottom of the chamber, and dumping the slurry when the accumulation exceeds a predetermined limit.

3. The method described in claim 1 characterized by forming the foam from a synthetic material liquid foaming agent mixed with water in one to six parts foaming agent to about one hundred parts of water, by volume, and with an expansion factor of 25–100 to obtain a foam strong enough to trap and hold the particulate matter in the slurry while it drains out of the chamber of the separator.

4. The method described in claim 1 characterized by bringing the particles and the gas containing them into contact with a foam having bubbles between 0.0005 and 0.015 inch in diameter, and coordinating the rate of foam supply with the quantity of particles to maintain a supply of foam during the entire removal process and as foam is destroyed by contact of the particles with the bubbles of the foam.

5. The method described in claim 1 characterized by trapping particulate matter of small size between 1 and 50 microns by bringing the particulate matter into contact with foam bubbles of a diameter between 0.0005 and 0.015 inch.

6. The method described in claim 1 characterized by bringing the particles in the gas into contact with the foam and bursting bubbles with which the particles contact, wetting the particles by the implosion of the bursted bubbles, trapping the wetted particles on the surfaces of foam bubbles adjacent to those that are bursted by the particles, and carrying the particles away in a foam slurry before the foam has had time to collapse into a liquid mass.

7. The method described in claim 6 characterized by applying the foam to a wall of a chamber of substantially circular cross section, passing the particle-laden gas axially along a course within the chamber and with the gas moving along a helical path at high velocity so that particulate matter in the gas is thrown outward by centrifugal force and into contact with the foam on the wall of the chamber.

8. The method described in claim 6 characterized by passing the dust-laden gas through a cyclone separator having a frusto-conical chamber enclosed by a wall, locating the chamber with the larger diameter end of the chamber higher than the small diameter end of the chamber introducing the particle-laden gas, applying the foam to the inside surface of the wall at the upper part thereof, and moving the foam down the wall by combined forces of gravity and friction with the helically moving gas stream in the chamber, and draining a slurry of foam and particuate matter from the lower end of the cyclone separator.

9. The method described in claim 8 characterized by applying a viscous foam to the sides of the walls of the separator and moving the particle-laden gas across the surface of the foam with a velocity more than twice the velocity of movement of the foam whereby particulate matter contacting with the foam strikes bubbles of the foam with substantial velocity.

* * * * *